United States Patent
Fukuda et al.

(10) Patent No.: US 8,683,794 B2
(45) Date of Patent: Apr. 1, 2014

(54) CONTROLLER OF VEHICLE WITH HYDROSTATIC CONTINUOUSLY VARIABLE TRANSMISSION

(75) Inventors: Yuji Fukuda, Hiratsuka (JP); Naritoshi Ohtsukasa, Ebina (JP)

(73) Assignee: Komatsu Ltd., Tokyo (JP)

( * ) Notice: Subject to any disclaimer, the term of this patent is extended or adjusted under 35 U.S.C. 154(b) by 1092 days.

(21) Appl. No.: 12/531,584

(22) PCT Filed: Mar. 27, 2008

(86) PCT No.: PCT/JP2008/055948
§ 371 (c)(1),
(2), (4) Date: Sep. 16, 2009

(87) PCT Pub. No.: WO2008/123376
PCT Pub. Date: Oct. 16, 2008

(65) Prior Publication Data
US 2010/0083652 A1    Apr. 8, 2010

(30) Foreign Application Priority Data
Mar. 30, 2007    (JP) .................................. 2007-093136

(51) Int. Cl.
F16D 31/02    (2006.01)
(52) U.S. Cl.
USPC ............................................. 60/431; 60/490
(58) Field of Classification Search
USPC .......................................... 60/490, 492, 431
See application file for complete search history.

(56) References Cited

U.S. PATENT DOCUMENTS

| | | | | |
|---|---|---|---|---|
| 5,390,759 A | * | 2/1995 | Gollner .......................... | 180/307 |
| 5,524,436 A | * | 6/1996 | Ishino et al. ..................... | 60/448 |
| 6,202,016 B1 | * | 3/2001 | Stephenson et al. ............. | 701/51 |
| 6,519,937 B2 | * | 2/2003 | Nanri et al. ..................... | 60/327 |
| 6,609,368 B2 | * | 8/2003 | Dvorak et al. .................. | 60/425 |
| 7,044,257 B2 | * | 5/2006 | Kempf et al. ................. | 180/305 |
| 2005/0282682 A1 | | 12/2005 | Ishii et al. ..................... | 477/107 |

FOREIGN PATENT DOCUMENTS

| | | |
|---|---|---|
| CN | 1065324 A | 10/1992 |
| JP | 01-098755 | 4/1989 |
| JP | 03-144164 | 6/1991 |
| JP | 03-219167 | 9/1991 |
| JP | 11-62845 | 3/1999 |
| JP | 11-062845 * | 5/1999 |
| JP | 11-210880 | 8/1999 |
| JP | 2001-235032 A1 | 8/2001 |
| JP | 2004-28229 A1 | 1/2004 |
| JP | 2006-7819 A1 | 1/2006 |

OTHER PUBLICATIONS

International Search Report for International Application No. PCT/JP2008/055948 dated Jun. 5, 2008.
Refusing Reason Notice dated Jan. 24, 2012 received the Japanese Patent Office in counterpart application No. 2009-509178 with English translation (6 pages).
First Office Action received on corresponding application No. 200880017558.3 from the State Intellectual Property Office of People's Republic of China dated May 24, 2012 with English translation (16 pages).

* cited by examiner

*Primary Examiner* — Edward Look
*Assistant Examiner* — Michael Quandt
(74) *Attorney, Agent, or Firm* — Kratz, Quintos & Hanson, LLP

(57) ABSTRACT

By accurately determining timing for suppressing overrun in a hydraulic motor or the like, work efficiency is prevented from falling. A pressure difference ΔP between pressure Pa on a discharge port side of a hydraulic pump and pressure Pb on suction port side of the hydraulic pump is calculated on the basis of the detected travel direction of the vehicle and the pressure Pa relative to Pb detected at the respective port sides of the hydraulic pump. At least one of an engine and the hydraulic pump is controlled, according to the calculated pressure difference, such that overrun of at least one of the engine, the hydraulic pump, and a hydraulic motor is suppressed.

6 Claims, 10 Drawing Sheets

CONTROLLER OF VEHICLE WITH HYDROSTATIC CONTINUOUSLY VARIABLE TRANSMISSION

TECHNICAL FIELD

The present invention relates to a control device of a vehicle that is applied to a vehicle having a hydrostatic continuously variable transmission (HST).

BACKGROUND ART

Transmissions called hydrostatic continuously variable transmissions (HST: Hydrostatic Transmission; hereafter called "HST" as appropriate) are mounted in wheel loaders, wheel excavator, bulldozers, forklifts, and other work vehicles. As shown in FIG. 7, a closed-circuit HST includes a hydraulic pump 1 connected to the output shaft of an engine 4, a hydraulic motor 2 connected to a drive shaft 5a, and a closed circuit 3 linking the hydraulic pump 1 and the hydraulic motor 2.

The hydraulic pump 1 is driven by the engine 4, and pressurized oil is discharged from a port 1a at one side of the hydraulic pump 1, according to the travel direction of the vehicle. Pressurized oil discharged from the hydraulic pump 1 flows through an oil path 3a at one side into a port 2a at one side of the hydraulic motor 2. By this means, the hydraulic motor 2 is rotated, and the drive wheels 5 are driven. Pressurized oil flows out from a port 2b at another side of the hydraulic motor 2, passes through an oil path 3b at another side and is suctioned into a port 1b at another side of the hydraulic pump 1.

When a vehicle equipped with HST travels on a slope, the vehicle is accelerated by gravitational force, and the drive wheels 5 are rotated to generate a force equal to or stronger than the driving force of the hydraulic motor 2. As a result, the hydraulic motor 2 is caused to rotate and be driven by the driving wheels 5, and discharges high-pressure oil to the suction-side oil path 3b. Then, the high-pressure oil passes through the suction-side oil path 3b and is forced into the port 1b of the hydraulic pump 1, and the hydraulic pump causes the engine 4 to rotate and drive. Consequently there is a concern that the engine 4, hydraulic pump 1, and hydraulic motor 2 may rotate at a rotation rate exceeding the rated rotation rates (occurrence of overrun), causing oil film breakdown, cavitation, and other problems.

Further, while the vehicle is descending a slope at high speed, if the operator downshifts and the capacity of the hydraulic motor 2 increases, a larger quantity of high-pressure oil is discharged to the suction-side oil path 3b. Consequently, the high-pressure oil is forced through the suction-side oil path 3b into the port 1b of the hydraulic pump 1, and the hydraulic pump 1 causes the engine 4 to rotate and drive, so that overrun of the engine 4 and hydraulic pump 1 likely occurs. Hence, before downshifting, it is necessary to judge that the engine 4 and the hydraulic pump 1 do not exceed the rated rotation rates.

In Patent References 1 through 3 below, inventions are disclosed relating to vehicles equipped with HST, in which overrun is suppressed or downshifting is prohibited when the vehicle speed reaches or exceeds a prescribed value.

Patent Reference 1 discloses an invention in which the HST hydraulic motor capacity is adjusted according to the difference between the vehicle speed detected by a vehicle speed sensor and a preset limiting vehicle speed, to prevent overrun.

Patent Reference 2 discloses an invention in which, when the vehicle speed detected by a vehicle speed sensor reaches a prescribed value, the HST hydraulic motor capacity is increased to a capacity generating a prescribed braking force, to prevent overrun.

Patent Reference 3 discloses an invention in which. when the vehicle axle rotation rate (vehicle speed) detected by a vehicle axle rotation rate sensor connected to the HST hydraulic motor exceeds the allowable hydraulic motor rotation rate, the hydraulic motor rotation rate is reduced, to prevent overrun. This Patent Reference 3 also discloses an invention in which, when downshifting is performed, a judgment is made as to whether downshifting causes the HST hydraulic motor rotation rate to exceed the allowable rotation rate, and when it is judged that the allowable rotation rate is exceeded, downshifting is prohibited. but after the hydraulic motor rotation rate is reduced downshifting is executed, to prevent overrun.

Patent Reference 1: Japanese Patent Application Publication No. 2004-28229

Patent Reference 2: Japanese Patent Application Publication No. 2001-23503

Patent Reference 3: Japanese Patent Application Publication No. 11-62845

DISCLOSURE OF THE INVENTION

Problems to be Solved by the Invention

In all of the inventions disclosed in the above-described patent references, a vehicle speed detected by a vehicle sensor and a target vehicle speed which is a condition for performing overrun control are used to decide whether overrun control is performed according to whether the vehicle speed has reached the target vehicle speed, and control is performed to add limits to the vehicle speed.

However, if the vehicle speed is used as a decision condition, then when the accelerating force changes due to the change in gradient of a slope, or change in load (the vehicle weight) or similar, optimal control may not be possible.

For example, in a case where the difference between a target vehicle speed and the vehicle speed at which overrun occurs, which is a condition for performing overrun control, is reduced, if a slope gradient is gentle or a load (vehicle weight) is light, the vehicle speed gradually rises when the vehicle travels on a slope, so that overrun control can be accurately executed. However, if the slope gradient is steep, or if the load (vehicle weight) is heavy, the vehicle speed rises rapidly, so that the timing of control lags, and there is the possibility of occurrence of overrun.

Conversely, in a case where the difference between a target vehicle speed and the vehicle speed at which overrun occurs, which is a condition for performing overrun control, is increased, and the target vehicle speed is set assuming a steep slope gradient or a heavy load (vehicle weight), then when the slope is gradual or the load (vehicle weight) is light, overrun control is performed early, so that overrun control is executed at a low vehicle speed. As a result, the vehicle speed is unnecessarily suppressed at times in which vehicle speed control is not necessary, so that time is required for vehicle travel, the time to perform work is lengthened, and work efficiency suffers.

The present invention has been made in light of these circumstances, and the purpose of the present in is to resolve these problems by accurately deciding the timing for suppression of overrun of the hydraulic motor or similar to prevent a decline in work efficiency.

Means for Solving the Problem

A first aspect of the present invention provides a control device of a vehicle that is applied to a vehicle having a hydrostatic transmission (HST) configured to include a hydraulic pump connected to an output shaft of an engine, a hydraulic motor connected to a drive wheel, and a closed circuit linking the hydraulic pump and the hydraulic motor, the control device comprising: vehicle travel direction detection means for detecting a travel direction of the vehicle; pressure detection means for detecting a pressure of pressurized oil on a discharge port side and on a suction port side of the hydraulic pump; pressure difference calculation means for calculating a pressure difference between pressure on the discharge port side of the hydraulic pump and pressure on the suction port side of the hydraulic pump on the basis of the detected travel direction of the vehicle and of the detected pressures on the discharge port side and the suction port side of the hydraulic pump; and control means for controlling at least one of the engine and the hydraulic pump, according to the calculated pressure difference, such that overrun is suppressed in at least one of the engine, the hydraulic pump, and the hydraulic motor.

A second aspect of the present invention provides the control device according to the first aspect of the present invention, wherein the control means suppresses the overrun by controlling a capacity of the hydraulic pump to be small.

A third aspect of the present invention provides the control device according to the first aspect of the present invention, wherein the control means suppresses the overrun by controlling an engine throttle amount to be small.

A fourth aspect of the present invention provides a control device of a vehicle that is applied to a vehicle having a hydrostatic transmission (HST) configured to include a hydraulic pump connected to an output shaft of an engine, a hydraulic motor connected to a drive wheel, and a closed circuit linking the hydraulic pump and the hydraulic motor, the control device comprising: vehicle travel direction detection means for detecting a travel direction of the vehicle; pressure detection means for detecting a pressure of pressurized oil on a discharge port side and on a suction port side of the hydraulic pump; downshifting means for downshifting by limiting a capacity of the hydraulic motor; downshifting instruction means for instructing the downshifting means to perform downshifting; pressure difference calculation means for calculating a pressure difference between pressure on the discharge port side of the hydraulic pump and pressure on the suction port side of the hydraulic pump on the basis of the detected vehicle travel direction and of the detected pressures on the discharge port side and the suction port side of the hydraulic pump; and control means for executing control so as to prohibit downshifting performed by the downshifting means regardless of an instruction from the downshifting instruction means, according to the calculated pressure difference.

A fifth aspect of the present invention provides the control device according to the first aspect of the present invention through the fourth aspect of the present invention, wherein a condition that a vehicle speed is greater than a prescribed threshold value is further added to a condition for executing control by the control means.

According to the first aspect of the present invention, as shown in FIG. 3B, in the pressure difference calculation means, the pressure difference ΔP between the pressure (Pa) on the discharge port side of the hydraulic pump 1 and the pressure (Pb) on the suction port side of the hydraulic pump 1 is calculated on the basis of the detected vehicle travel direction F, N, R and the detected pressures Pa, Pb detected on the sides of the ports 1a, 1b of the hydraulic pump 1 (steps 103, 104, 105 in FIG. 3B).

And, at least one among the engine 4 and the hydraulic pump 1 is controlled such that overrun of the hydraulic pump 1 is suppressed, according to the calculated pressure difference ΔP (steps 108, 111 in FIG. 3B).

Similarly, the engine 4 and/or hydraulic pump 1 are controlled such that overrun of the engine 4 is suppressed.

Similarly, the engine 4 and/or hydraulic pump 1 are controlled such that overrun of the hydraulic motor 2 is suppressed.

Specifically, by controlling the capacity of the hydraulic pump 1 at a small value, overrun is suppressed (second aspect of the present invention), Specifically, as shown in FIG. 2B, a braking rate K2 smaller than 1 is read out for a portion of the graph, and the pressure difference ΔP of the hydraulic pump 1 is limited to a small value so that the HST braking force is made larger.

Further, by controlling the throttle amount of the engine 4 at a small value, overrun is suppressed (third aspect of the present invention). Specifically, as shown in FIG. 2C, a throttle control rate K3 smaller than 1 is read out for a portion of the graph, and the throttle amount of the engine 4 is controlled at a small value.

According to the fourth aspect of the present invention, as shown in FIG. 3B, in the pressure difference calculation means, the pressure difference ΔP is similarly calculated on the basis of the detected vehicle travel direction F, N, R and the detected pressures Pa, Pb detected on the sides of the ports 1a, 1b of the hydraulic pump 1 (steps 103, 104, 105 in FIG. 3B).

And, control is performed, according to the calculated pressure difference ΔP, so as to prohibit downshifting by the downshifting means 11, regardless of instructions from the downshifting instruction means 31 (step 109 in FIG. 3B). Specifically, as shown in FIG. 2A, a decision to prohibit downshifting is made, and the capacity of the hydraulic motor 2 is limited to a small value so that the HST transmission ratio is not made any lower.

According to the fifth aspect of the present invention, in the first aspect of we present invention, the second aspect of the present invention, the third aspect of the present invention, and the fourth aspect of the present invention, the condition that the vehicle speed V be greater than a prescribed threshold value Vth (judgment YES in step 102) as indicated by step 102 in FIG. 3B is further added, and control to suppress overrun (first aspect of the present invention), or control to prohibit downshifting (second aspect of the present invention), or control to suppress overrun and control to prohibit downshifting (third aspect of the present invention), is performed.

Effect of the Invention

According to the present invention, the timing for execution of control to suppress overrun can be decided accurately. Hence travel of the vehicle 100 at a lower speed than is necessary is avoided, work times are shortened, and drops in work efficiency are suppressed.

BEST MODE FOR CARRYING OUT THE INVENTION

Below, a first exemplary embodiment of the present invention is explained, referring to the drawings.

FIG. 1A shows the configuration of the hydrostatic continuously variable transmission (HST) of the embodiment, a controller 10 which controls the HST, an operation device 30, and sensors 41A, 41B, 42, 43. This HST, the controller 10, the operation device 30, and the sensors 40 (41A, 41B, 42, 43, 44, 45, 46) are provided in a vehicle 100. As the vehicle 100, a wheel loader, a wheel tractor-scraper, a bulldozer, a forklift, or similar work vehicle is assumed.

As shown in FIG. 1A, the closed-circuit HST includes the hydraulic pump 1, the input shaft of which is connected to the output shaft 4a of the engine 4; the hydraulic motor 2, the output shaft of which is connected to the drive wheels 5 via the drive shaft 5a; and, the closed circuit 3, linking the hydraulic pump 1 and the hydraulic motor 2.

The closed circuit 3 includes the oil path 3a and the oil path 3b. The oil path 3a links one port 1a of the hydraulic pump 1 and one port 2a of the hydraulic motor 2. The oil path 3b links another port 1b of the hydraulic pump 1 and another port 2b of the hydraulic motor 2.

The hydraulic pump 1 is a hydraulic pump with variable capacity, with flow in two directions and rotation in one direction. The inclination of the swash plate 1c of the hydraulic pump 1 is adjusted by a capacity adjustment valve 6. The capacity adjustment valve 6 is driven according to a hydraulic signal provided from electromagnetic proportional valves 7A, 7B. When a control current is applied to the electromagnetic proportional valve 7A, a hydraulic signal is applied from the electromagnetic proportional valve 7A to the capacity adjustment valve 6, and the swash plate 1c of the hydraulic pump 1 is driven such that pressurized oil with capacity qp (cc/rev) corresponding to the control current is discharged from one port 1a of the hydraulic pump 1. Similarly, when a control current is applied to the electromagnetic proportional valve 7B, a hydraulic signal is applied from the electromagnetic proportional valve 7B to the capacity adjustment valve 6, and the swash plate 1c of the hydraulic pump 1 is driven such that pressurized oil with capacity qp (cc/rev) corresponding to the control current is discharged from another port 1b of the hydraulic pump 1.

The hydraulic motor 2 is a hydraulic motor with variable capacity, with flow in two directions and rotation in two directions. The inclination of the swash plate 2c of the hydraulic motor 2 is adjusted by a capacity adjustment valve 8. The capacity adjustment valve 8 is driven according to a hydraulic signal provided from an electromagnetic proportional valve 9. When a control current is applied to the electromagnetic proportional valve 9, a hydraulic signal is applied from the electromagnetic proportional valve 9 to the capacity adjustment valve 8, and the swash plate 2c of the hydraulic motor 2 is driven such that pressurized oil with capacity qM (cc/rev) corresponding to the control current flows in from one port of the hydraulic motor 2 to the other port.

When the one port 1a of the hydraulic pump 1 is the discharge port side, the drive wheels 5 are driven in the forward direction (F), and when the other port 1b of the hydraulic pump 1 is the discharge port side, the drive wheels 5 are driven in the reverse direction (R).

The controller 10 includes a motor capacity limit calculation portion 11, a motor control current calculation portion 12, an inching rate calculation portion 14, an engine rotation-pump capacity command conversion portion 15, a descent decision portion 16, a first multiplication portion 18, a second multiplication portion 19, and a pump control current calculation portion 20. The descent decision portion 16 includes pressure difference computation means 16a, a transmission shift prohibition decision portion 13, and a braking rate calculation portion 17.

In the HST of this embodiment, automatic transmission shifting is performed. That is, by automatically changing the transmission ratio $$r = qp/qM$$

of the hydraulic pump 1 and hydraulic motor 2, transmission shifting is performed. By limiting the capacity qM of the hydraulic motor 2 to a smaller value, the hydraulic motor 2 operates at a higher rotation rate and lower torque, the transmission ratio r (=qp/qM) of the hydraulic pump 1 and hydraulic motor 2 is raised, and upshifting is performed. By limiting the capacity qM of the hydraulic motor 2 to a larger value, the hydraulic motor 2 operates at a lower rotation rate and higher torque, the transmission ratio r (=qp/qM) of the hydraulic pump 1 and hydraulic motor 2 is lowered, and downshifting is performed. This limiting value of the capacity qM of the hydraulic motor 2 is computed by the motor capacity limit calculation portion 11 of the controller 10. That is, the motor capacity limit calculation portion 11 includes the downshifting means.

Further, in the HST of this embodiment, by reducing the capacity qp of the hydraulic pump 1, HST braking is applied. That is, by reducing the capacity qp of the hydraulic pump 1, the rotation speed of the hydraulic motor 2, that is, the vehicle speed, is reduced. In this embodiment, as explained below, HST braking is applied by multiplying the capacity qp of the hydraulic pump 1 by a braking rate K1 or K2. As the values of the braking rates K1 and K2 become smaller than one, the HST braking force becomes greater. The braking rate K1 is a braking rate determined by the inching rate corresponding to the amount of depression of the inching pedal 32. The braking rate K2 is the braking rate defined in FIG. 2B.

The pressure sensors 41A, 41B are provided in the oil paths 3a, 3b respectively. The pressure sensors 41A, 41B detect the pressures Pa, Pb of pressurized oil on the sides of the ports 1a, 1b respectively of the hydraulic pump 1. Regarding the pressure sensors 41A, 41B, sensors provided to existing vehicles can be used as sensors employed in determining the timing of automatic transmission shifting.

The engine rotational speed sensor 42 is provided on the output shaft 4a of the engine 4. The engine rotational speed sensor 42 detects the rotational speed Ne of the engine 4.

The vehicle speed sensor 43 is provided on the drive shaft 5a of the drive wheels 5. The vehicle speed sensor 43 detects the speed V of the vehicle 100.

The operation device 30 includes a speed adjustment dial 31 as downshift instruction means, an inching pedal 32, and a shift lever 33. The operation device 30 is provided within the operation cabin of the vehicle 100.

The speed adjustment dial 31 includes downshift instruction means, which issues instructions to perform downshifting until a speed is reached corresponding to the operation amount. The operation amount of the speed adjustment dial 31 is detected by a potentiometer 46, and is input to the motor capacity limit calculation portion 11 serving as downshifting means.

The inching pedal 32 is provided in order to apply HST braking by means of a manual operation. The braking rate K1 changes according to the amount of depression of the inching pedal 32, and the capacity qp of the hydraulic pump 1 changes. An inching pedal operation amount detection sensor 45 is provided on the inching pedal 32. The inching pedal operation amount detection sensor 45 detects the depression operation amount of the inching pedal 32.

The shift lever 33 is provided to enable selection of forward travel (F), neutral (N), and reverse travel (R) of the vehicle 100. A shift position sensor 44 is provided on the shift lever 33 as vehicle travel direction detection means. The shift position sensor 44 detects the direction of travel of the vehicle 100 currently selected by the shift lever 33, that is, forward travel (F), neutral (N), or reverse travel (R).

FIG. 2A shows the contents of a downshift decision table, stored in advance in the transmission shift prohibition decision portion 13. And, FIG. 2B shows the contents of a braking rate table, stored in advance in the braking rate calculation portion 17.

The horizontal axis in FIG. 2A is the pressure difference ΔP between the pressure on the discharge port side of the hydraulic pump 1 and the pressure on the suction port side; the vertical axis is the decision to "prohibit" downshifting or the decision to "cancel" prohibition of downshifting. A decision to prohibit downshifting, or to cancel the prohibition of downshifting, is made according to the magnitude of the pressure difference ΔP. When the pressure difference ΔP takes a value of P1 or greater, a decision is made to cancel prohibition of downshifting; when the pressure difference ΔP is P2 or less, a decision is made to prohibit downshifting. When the pressure difference ΔP is near 0, hysteresis is provided in order to prevent hunting.

The horizontal axis in FIG. 2B similarly is the pressure difference ΔP, and the vertical axis is the braking rate K2. The braking rate K2 changes according to the magnitude of the pressure difference ΔP. When the pressure difference ΔP takes a value of P3 or higher, the braking rate K2 is 1, and when the pressure difference ΔP is lower than P3, the braking rate K2 is smaller than 1.

FIG. 3A is a flowchart showing the procedure for processing performed in the controller 10. Below, processing performed in the controller 10 is explained, referring to FIG. 3A.

The descent decision portion 16 of the controller 10 takes as input the current direction of travel of the shift lever 33 detected by the shift position sensor 44, that is, forward travel (F), neutral (N), or reverse travel (R), as well as the pressures Pa, Pb of pressurized oil on the sides of the ports 1a, 1b of the hydraulic pump 1 detected by the pressure sensors 41A, 41B. The vehicle speed V detected by the vehicle speed sensor 43 is also input as vehicle speed information (step 101).

Next, a judgment is made as to whether the vehicle speed V is greater than a prescribed threshold value Vth, that is whether $$V > Vth \tag{1}$$

When the vehicle speed V is equal to or lower than a prescribed threshold value Vth (judgment NO in step 102), the braking rate calculation portion 17 of the descent decision portion 16 forcibly sets the braking rate K2 to 1, regardless of the magnitude of the pressure difference ΔP between the pressure on the discharge port side of the hydraulic pump 1 and the pressure on the suction port side, and the capacity of the hydraulic pump 1 is controlled such that the capacity $$qp = K1 \cdot qp' \tag{2}$$

is obtained (step 106) wherein qp' is a capacity of the hydraulic pump 1, described below; in addition, in the transmission shift prohibition decision portion 13 of the descent decision portion 16, it is decided that downshifting prohibition is to be canceled, regardless of the magnitude of the pressure difference ΔP between the pressure on the discharge pert side of the hydraulic pump 1 and the pressure on the suction port side, and the capacity qM of the hydraulic motor 2 is controlled so as to downshift to the transmission ratio r currently adjusted by adjustment using the speed adjustment dial 31 (step 107).

That is, even when the vehicle 100 is descending, if the load is heavy and the vehicle weight is heavy, the pressure difference ΔP falls below the threshold value (P3, P2) of FIG. 2 at a stage in which the vehicle speed V is low, and consequently the vehicle 100 is unnecessarily decelerated at a stage in which the vehicle speed V is low, and resultantly work efficiency is lost. Hence at a stage in which the vehicle speed V has not reached the threshold value Vth, even if the pressure difference ΔP is equal to or less than the threshold value, control to decelerate the vehicle 100 is not executed.

On the other hand, when the vehicle speed V is greater than the prescribed threshold value Vth (judgment YES in step 102), control to cause deceleration of the vehicle 100 is allowed, and processing proceeds to the next step 103.

Here, whether the vehicle 100 is descending a slope or not can be decided as follows.

Vehicle 100 travels forward descending a slope.

The selected position of the shift lever 33 is forward travel (F) or neutral (N), and moreover $$Pa < Pb \tag{3}$$

Vehicle 100 travels in reverse descending a slope.

The selected position of the shift lever 33 is reverse travel (R), and moreover $$Pa > Pb \tag{4}$$

That is, when a vehicle 100 equipped with HST descends a slope, the drive wheels 5 are caused to rotate by gravitational force. Hence when for example the vehicle 100 is traveling forward, the hydraulic motor 2 is caused to rotate and drive by the drive wheels 5, and pressurized oil at high pressure Pb is discharged into the oil path 3b on the suction side. As a result, the pressure Pb on the suction side becomes higher than the pressure Pa on the discharge side. During reverse travel of the vehicle, the pressure Pa on the suction side becomes higher than the pressure Pb on the discharge side.

Hence when the vehicle 100 travels in the forward direction F (judgment NO in step 103), the pressure difference ΔP defined as ΔP=Pa−Pb is calculated, and from equation (3) above it may be judged whether the vehicle 100 is descending a slope (step 105). When on the other hand the vehicle 100 travels in the reverse direction R (judgment YES in step 103), the pressure difference ΔP defined as ΔP=Pb−Pa is calculated, and from equation (4) above it may be judged whether the vehicle 100 is descending a slope (step 104). Calculation of the above-described pressure difference ΔP is performed by the pressure difference calculation means 16a.

When the vehicle 100 travels in the forward direction F, the braking rate K2 is read out from the braking rate table in FIG. 2B, according to the pressure difference ΔP (=Pa−Pb) between the pressure Pa on the discharge port side of the hydraulic pump 1 and the pressure Pb on the suction port side. When the vehicle 100 travels in the reverse direction R, the braking rate K2 is read out from the braking rate table in FIG. 2A, according to the pressure difference ΔP (=Pb−Pa) between the pressure Pb on the discharge port side of the hydraulic pump 1 and the pressure Pa on the suction port side. This processing is performed by the braking rate calculation portion 17 of the controller 10.

The engine rotational speed Ne detected by the rotational speed sensor 42 is input to the engine rotation-pump capacity command conversion portion 15 of the controller 10, and is converted into a capacity qp' of the hydraulic pump 1 corresponding to the engine rotational speed Ne. A capacity qp' of the hydraulic pump 1 is determined such that higher the engine rotational speed Ne, the larger the capacity qp' of the hydraulic pump 1.

In the first multiplication portion 18 of the controller 10, processing is performed to multiply the capacity qp' of the hydraulic pump 1 by the braking rate K2, to determine The inching rate calculation portion 14 of the controller 10 takes as input the amount of depression operation of the inching pedal 32 detected by the inching pedal operation amount detection sensor 45, and determines the inching rate corresponding to the amount of depression of the inching pedal 32, that is, the braking rate K1. The braking rate K1 is determined such that the greater the amount of depression of the inching pedals 32, the smaller value of the braking rate K1, and the greater value of the HST braking force.

In the second multiplication portion 19, processing is performed to multiply the braking rate K1 by the product of the braking rate K2 and the pump capacity qp', to determine the pump capacity qp:

$$qp = K1 K2 qp' \qquad (5)$$

In the pump control current calculation portion 20 of the controller 10, a control current is generated so that the hydraulic pump 1 obtains the pump capacity qp (=K1·K2·qp'), obtained by multiplying the braking rates K1 and K2, and this control current is output to the electromagnetic proportional valves 7A, 7B. By this means the inclination of the swash plate 1c of the hydraulic pump 1 is adjusted, and the capacity qp of the hydraulic pump 1 is limited to the capacity indicated by equation (5) above. Here, when the pressure difference ΔP falls to the threshold value P3 or less, the braking rate K2 is smaller than 1, and the capacity qp of the hydraulic pump 1 is limited to a small capacity. By this means the capacity qp of the hydraulic pump 1 is controlled and limited. As a result, the rotation rate of the hydraulic pump 2, that is, the vehicle speed, is decreased. By this means, overrun of the engine 4 and/or hydraulic pump 1 and/or hydraulic motor 2 is suppressed. On the other hand, when the pressure difference ΔP becomes greater than the threshold value P3, the braking rate K2 is set to 1, similarly to step 106 above, and the capacity of the hydraulic pump 1 is limited according to the braking rate K1 as in equation (2) above (qp=K1·qp') (step 108).

On the other hand, when the vehicle 100 travels forward, the result of the decision for prohibiting downshifting (or for canceling the prohibition) is read out from the downshifting decision table in FIG. 2A, according to the pressure difference ΔP (=Pa−Pb) between the pressure Pa on the discharge port side of the hydraulic pump 1 and the pressure Pb on the suction port side. And when the vehicle 100 travels in reverse, the result of the decision for prohibiting downshifting (or for canceling the prohibition) is read out from the downshifting decision table in FIG. 2A, according to the pressure difference ΔP (=Pb−Pa) between the pressure Pb on the discharge port side of the hydraulic pump 1 and the pressure Pa on the suction port side. This processing is performed by the transmission shift prohibition decision portion 13 of the controller 10.

Below, a case is explained in which the pressure difference ΔP is equal to or less than the threshold value P2, and the result of the downshift prohibition decision is read out from the downshift decision table in FIG. 2A.

The operation amount of the speed adjustment dial 31 detected by the sensor 46, and the downshift prohibition decision result, are input to the motor capacity limit calculation portion 11 of the controller 10.

The speed adjustment dial 31 is provided for adjusting the transmission ratio $$r = qp/qM$$

of the hydraulic pump 1 and hydraulic motor 2 according to the amount of dial operation. When the downshift prohibition decision result is input, if the transmission ratio r resulting from current adjustment by the speed adjustment dial 31 is lower than the previous transmission ratio r', and is a transmission ratio for which downshifting is performed, the capacity qM of the hydraulic motor 2 is limited to a small value so that the previous transmission ratio r' is maintained and downshifting is prohibited.

In the motor control current calculation portion 12 of the controller 10, the pump capacity qp (=K1·K2·qp') and the previous transmission ratio r' are used to determine the motor capacity qM (=qp/r'), and the control current necessary to obtain this capacity qM in the hydraulic motor 2 is generated and is output to the electromagnetic proportional valve 9. This makes inclination of the swashplate 2c of the hydraulic motor 2 adjusted, and the capacity of the hydraulic motor 2 is limited to a low capacity at which downshifting is prohibited.

On the other hand, when the pressure difference ΔP is equal to or greater than the threshold value P1, and the downshift prohibition cancellation decision result is read out from the downshift decision table in FIG. 2A, the capacity qM of the hydraulic motor 2 is controlled, similarly to step 107 above, such that downshifting is performed to the transmission ratio r currently adjusted using the speed adjustment dial 31 (step 109).

In the above-described embodiment, when the vehicle speed V is at or below a prescribed threshold value Vth (judgment NO in step 102), the braking rate K2 is forcibly set to 1 (step 106), and in addition the downshifting prohibition is forcibly canceled (step 107), whereas when the vehicle speed V is equal to or above the prescribed threshold value Vth (judgment YES in step 102), the braking rate K2 corresponding to the pressure difference ΔP is read out from the braking rate table (step 108), and in addition the downshifting prohibition (or prohibition canceling) decision result corresponding to the pressure difference ΔP is read out from the downshifting decision table (step 109). However, a configuration may also be possible in which, regardless of the decision result for the magnitude of the vehicle speed V, the braking rate K2 corresponding to the pressure difference ΔP is read out from the braking rate table (step 108), and moreover the downshifting prohibition (or prohibition canceling) decision result corresponding to the pressure difference ΔP is read out from the downshifting decision table (step 109).

The flowchart in this case is as shown in FIG. 4A. That is, in FIG. 3A, the processing of step 102 to judge the magnitude of the vehicle speed V, and the processing of step 106 to forcibly set the braking rate K2 to 1 and of step 107 to forcibly cancel the downshifting prohibition, omitted, and when the processing of step 101 ends, the procedures of step 103, step 108, and step 109 are performed.

Next, effects of this embodiment are explained.

FIG. 5 shows some of the forces acting on the vehicle body when the vehicle 100 descends a slope. FIG. 5 shows an example in which a vehicle 100 with vehicle mass m is traveling or a slope with gradient θ, and the force F=mgsin·θ corresponding to the gravitational force is balanced by the force F' corresponding to tire friction, engine braking, and similar forces.

FIG. 6A shows the discharge-side pressure Pa and suction-side pressure Pb detected by the pressure sensors 41A and 41B respectively with the passage of time t, when the vehicle 100 is traveling forward over level ground.

FIG. 6B shows the discharge-side pressure Pa and suction-side pressure Pb detected by the respective pressure sensors 41A and 41B, with the passage of time t, when the vehicle 100 is descending a slope while traveling forward. In FIG. 6B, L1 indicated by a solid line is the change with time in the suction-side pressure Pb when the slope inclination angle θ is small, and/or when the weight m of the vehicle 100 is small; L2 indicated by a dashed line is the change with time in the suction-side pressure Pb when the slope inclination angle θ is large, and/or when the weight m of the vehicle 100 is large.

As shown in FIG. 5 and in FIG. 6A, because during travel by the vehicle 100 over level ground the degree to which the vehicle 100 is accelerated in the downward direction by gravitational force is substantially zero, the pressure Pb on the suction side of the hydraulic pump 1 does not exceed the discharge-side pressure Pa, and hence vehicle descent control and control to prohibit downshifting are not performed.

As shown in FIG. 5 and in FIG. 6B, when the slope inclination angle θ is small, and/or the weight m of the vehicle 100 is small, the degree to which the vehicle 100 is accelerated in the downward direction by gravitational force is small, so that the time at which the suction-side pressure Pb rises is late, and the pressure difference ΔP changes to a negative value at a later time t1 and falls to or below a threshold value (P3, P2). Thus, vehicle descent control and downshifting prohibition control are enabled at later times, preventing overrun (solid line L1). On the other hand, when the slope descent angle θ is large, and/or the weight m of the vehicle 100 is large, the degree to which the vehicle 100 is accelerated in the downward direction by gravitational force is large, so that the time at which the suction-side pressure Pb rises is early, and the pressure difference ΔP changes to a negative value at an earlier time t2 and falls to or below a threshold value (P3, P2). Thus, vehicle descent control and downshifting prohibition control are enabled at earlier times, preventing overrun (broken line L2).

With this embodiment, the timing with which control is performed to suppress overrun can be decided accurately. Hence unnecessary reduction in the speed of the vehicle 100 is avoided, work times are shortened, and reduction in work efficiency is suppressed.

In this embodiment, two types of control, which are vehicle descent control and control to prohibit downshifting, are performed simultaneously to prevent overrun. However, it may also be possible to perform only one type of control, either vehicle descent control or control to prohibit downshifting, to prevent overrun.

In this embodiment, overrun is suppressed by adjusting the capacity of the hydraulic pump 1 on the basis of vehicle travel direction detection means and the pressures detected on the discharge port side and on the suction port side of the hydraulic pump; but as shown in FIG. 1B, when the vehicle 100 is equipped with an electronic device 50 to control the engine 4, overrun may be suppressed by limiting the throttle amount of the engine 4, that is, the engine rotational speed.

FIG. 1B is a configuration diagram corresponding to FIG. 1A above.

FIG. 3B and FIG. 4B show flowcharts corresponding to the configuration of FIG. 1B. FIG. 3B is a flowchart corresponding to the above FIG. 3A, and FIG. 4B is a flowchart corresponding to the above FIG. 4A.

As shown in FIG. 1B, in the device of this embodiment, an engine control electronic device 50 which controls the throttle amount of the engine 4, that is, the engine rotational speed, is added to the configuration of FIG. 1A, and in addition, a throttle limiting rate calculation portion 51 is added to the descent decision portion 16.

In the throttle limiting rate calculation portion 51, the throttle limiting rate K3 is calculated according to a data table, an example of which is shown in FIG. 2C.

The throttle limiting rate table shown in FIG. 2C substitutes the throttle limiting rate K3 for the braking rate K2 in the braking rate table shown in FIG. 2B described above, and similarly associates throttle limiting rates K3 with pressure differences ΔP. The throttle limiting rate table is provided in order to limit the throttle amount of the engine 4, that is, the engine rotational speed, according to the pressure difference ΔP. As the throttle limiting rate K3 decreases from 1, the throttle amount of the engine 4 is reduced, and the upper limit of the engine rotational speed is lowered.

In the flowchart shown in FIG. 3B, steps 111 and 110 are added to the flowchart of FIG. 3A described above.

In step 111, similarly to the above-described step 108, a throttle limiting rate K3 is read out from the throttle limiting rate table according to the pressure difference ΔP, and the throttle amount of the engine 4, that is, the engine rotational speed, is controlled.

In step 110, similarly to the above-described step 106, the throttle limiting rate K3 is forcibly set to 1, and the throttle amount of the engine 4, that is, the engine rotational speed, is limited.

In the flowchart shown in FIG. 4B, step 111 of FIG. 3B is added to the flowchart of FIG. 4A described above.

As shown in FIG. 3B and FIG. 4B, similarly to the processing of the above-described FIG. 3A and FIG. 4A, when processing to calculate the pressure difference ΔP described in step 104 or step 105 is ended, the throttle limiting rate calculation portion 51 calculates the throttle limiting rate K3 corresponding to the pressure difference ΔP, according to the throttle limiting rate table shown in FIG. 2C. Information describing the throttle limiting rate K3 calculated by the throttle limiting rate calculation portion 51 is sent to the engine control electronic device 50. The engine control electronic device 50 adjusts the throttle amount of the engine 4 according to the throttle limiting rate K3 thus sent, and controls the engine rotational speed (step 111 in FIG. 3B and FIG. 4B).

Further, as shown in FIG. 3B, similarly to the processing of FIG. 3A described above, when it is judged that the magnitude of the vehicle speed V is equal to or less than the threshold value Vth (judgment NO in step 102), the throttle limiting rate K3 is forcibly set to 1, and information describing the throttle limiting rate K3 is similarly sent to the engine control electronic device 50. As a result, the throttle amount of the engine 4 is adjusted according to the throttle limiting rate K3, and the engine rotational speed is controlled (step 110 in FIG. 3B).

In this embodiment, as shown in FIG. 1A and FIG. 1B, an explanation has been given which assumes an HST comprising a variable-capacity hydraulic pump 1 and a variable-capacity hydraulic motor 2; but the present invention can also be applied to an HST comprising a variable-capacity hydraulic pump 1 and a fixed-capacity hydraulic motor 2, and the present invention may also be applied to an HST comprising a fixed-capacity hydraulic pump 1 and a variable-capacity hydraulic motor 2.

EXPLANATION OF REFERENCE NUMERALS

Figure 1A:
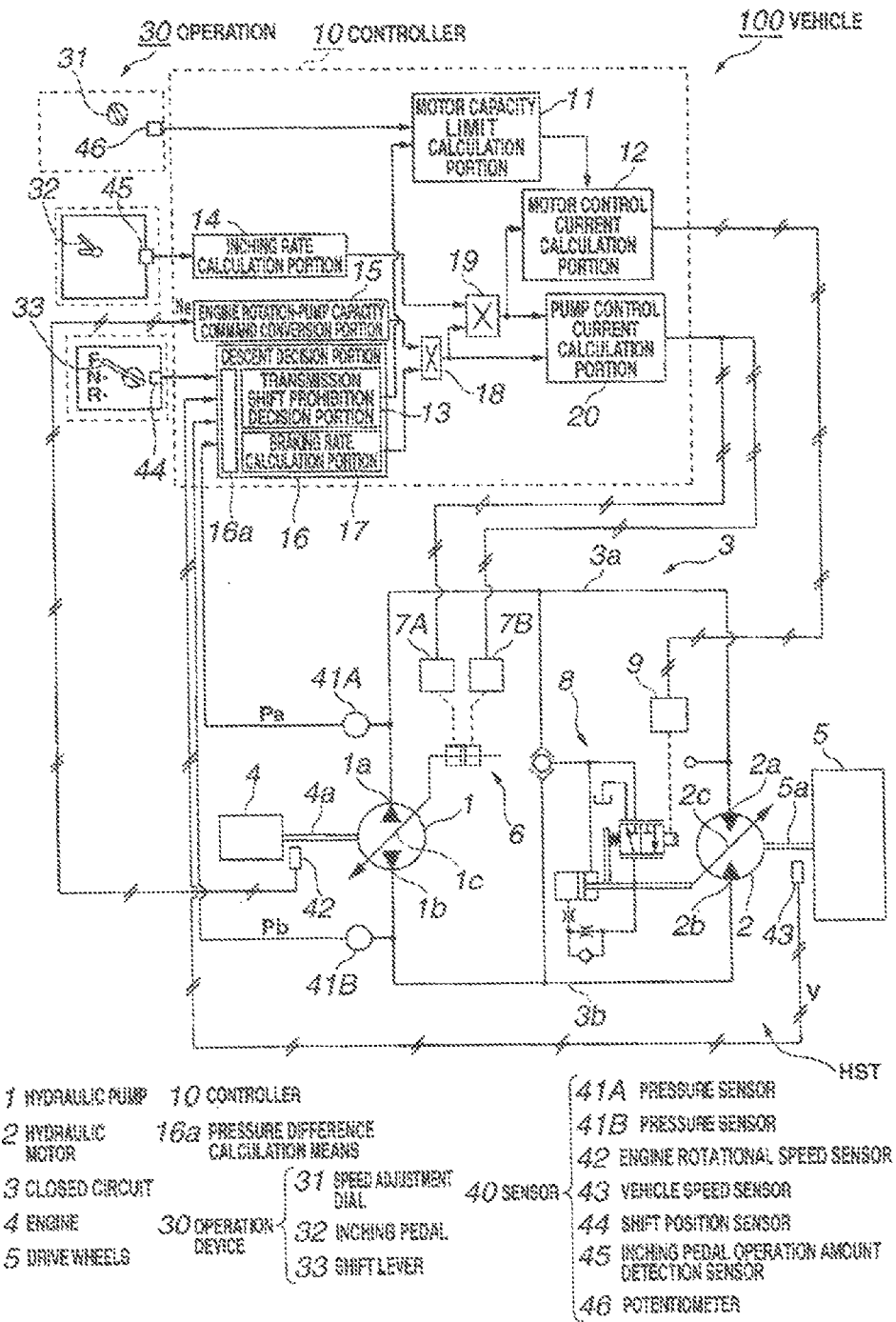
FIG. 1A shows the configuration of the HST of an embodiment, a controller which controls the HST, an operation device, and a sensor.
Figure 1B:
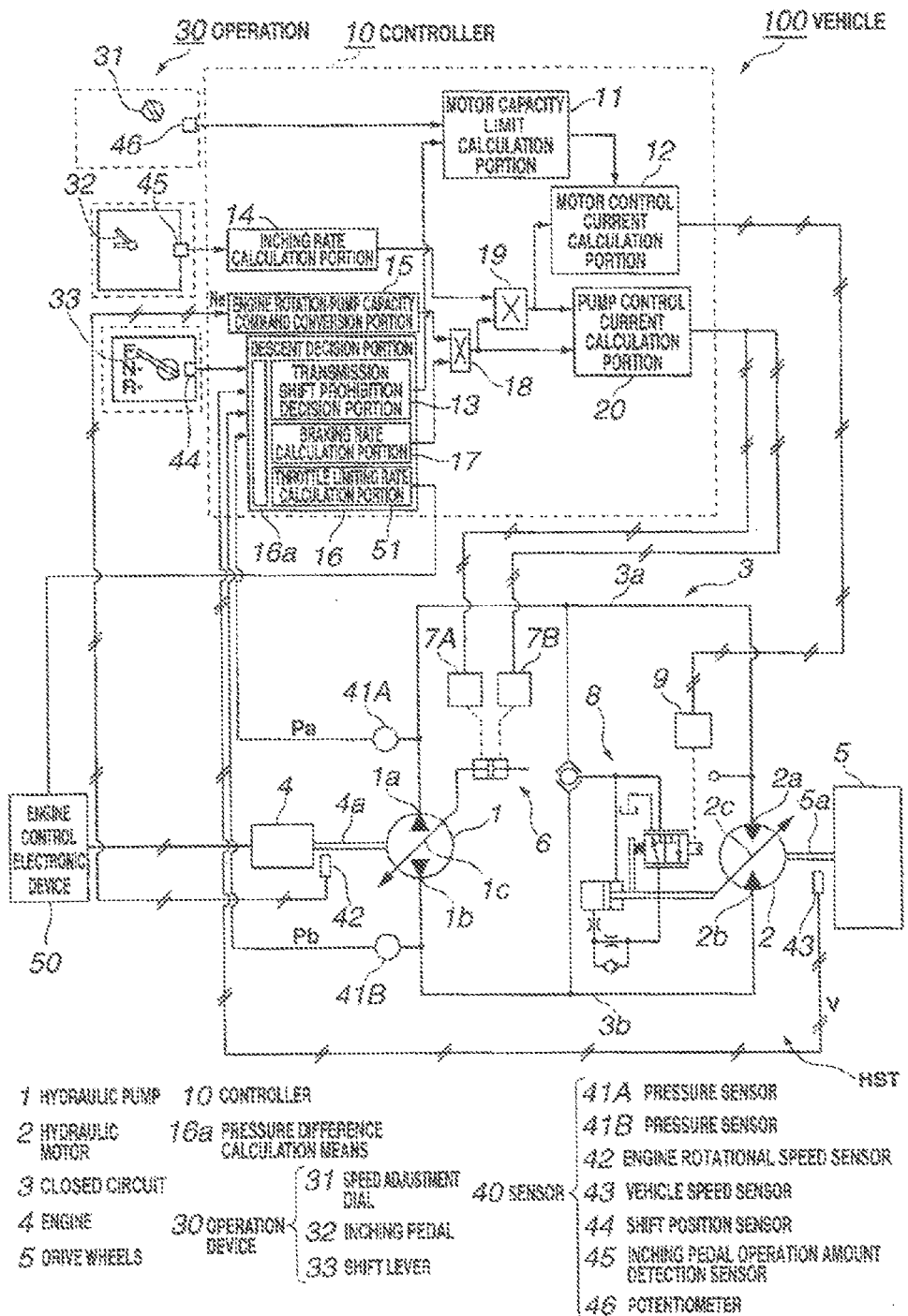
FIG. 1B is a configuration example differing in part from FIG. 1A, and is an example of the configuration of a device which limits the rotational speed of an engine using an engine control electronic device.
Figure 2A:
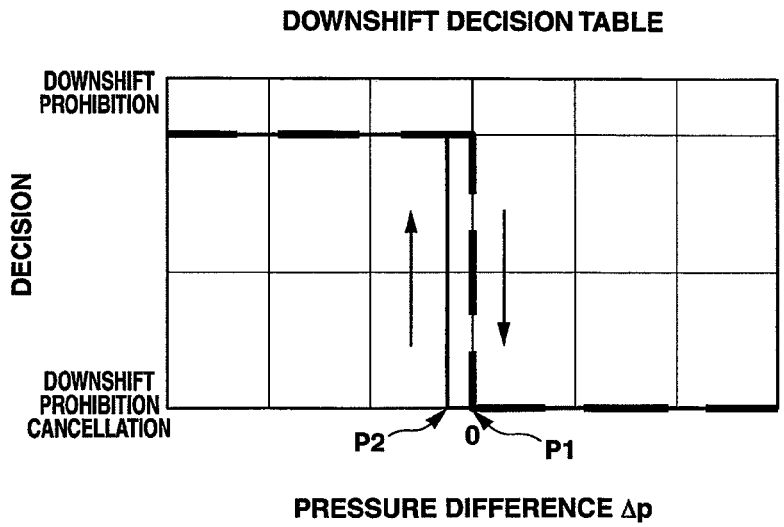
FIG. 2A shows the contents of a downshifting decision table.
Figure 2B:
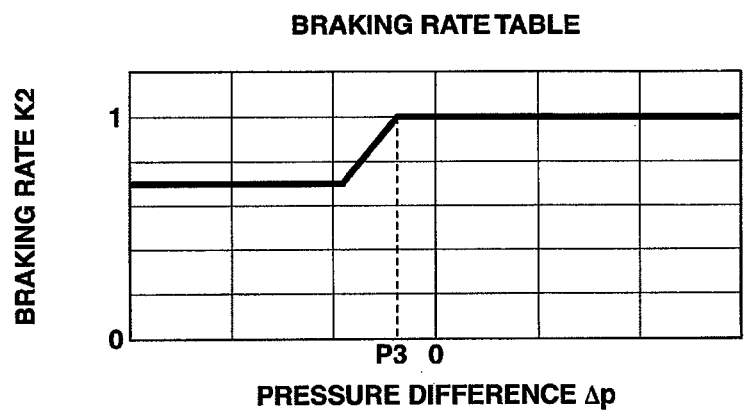
FIG. 2B shows the contents of a braking rate table.
Figure 2C:
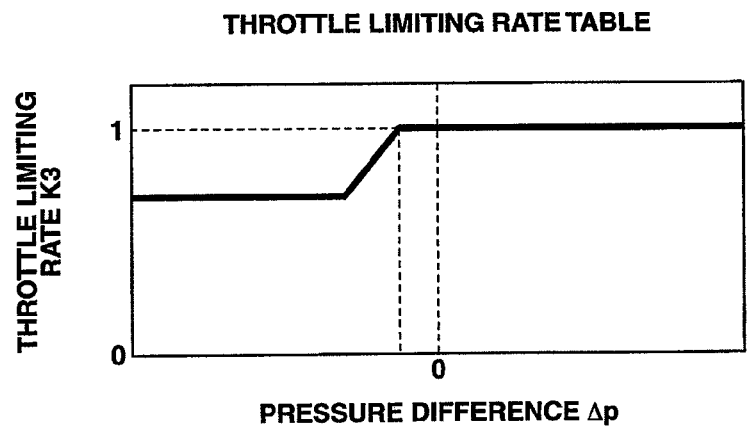
FIG. 2C shows the contents of a throttle limiting rate table.
Figure 3A:
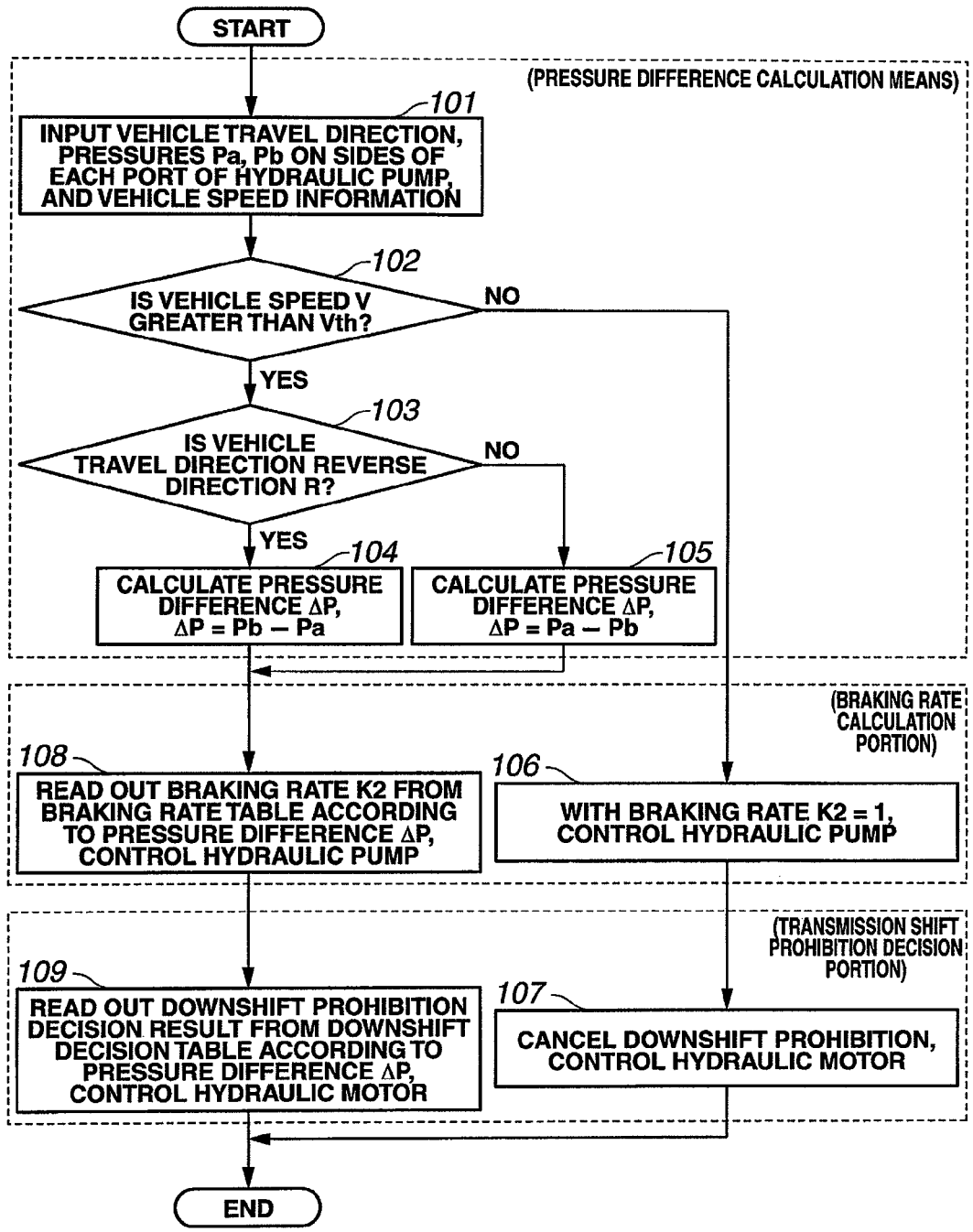
FIG. 3A is a flowchart corresponding to the configuration of FIG. 1A.
Figure 3B:
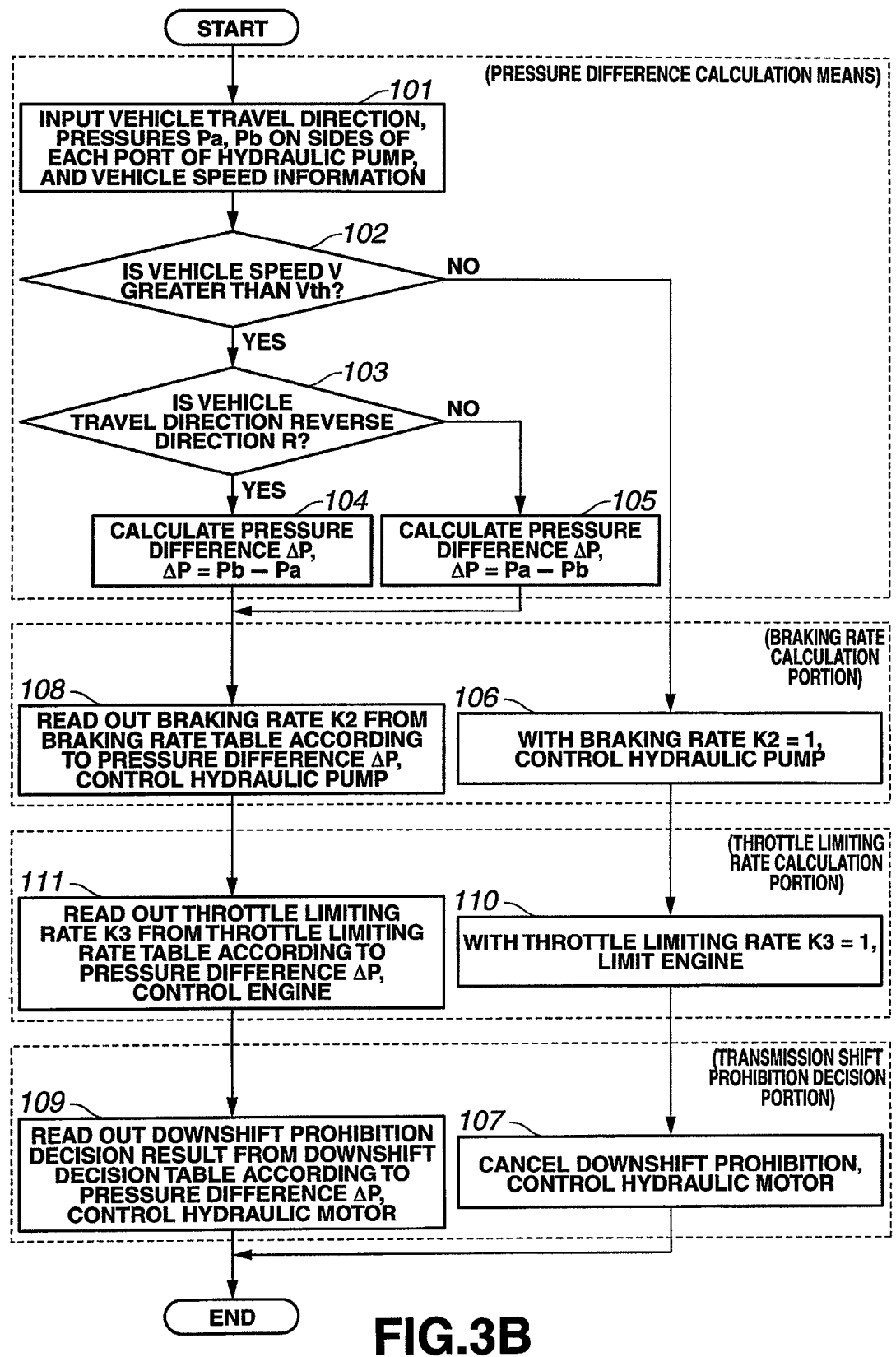
FIG. 3B is a flowchart corresponding to the configuration of FIG. 1B.
Figure 4A:
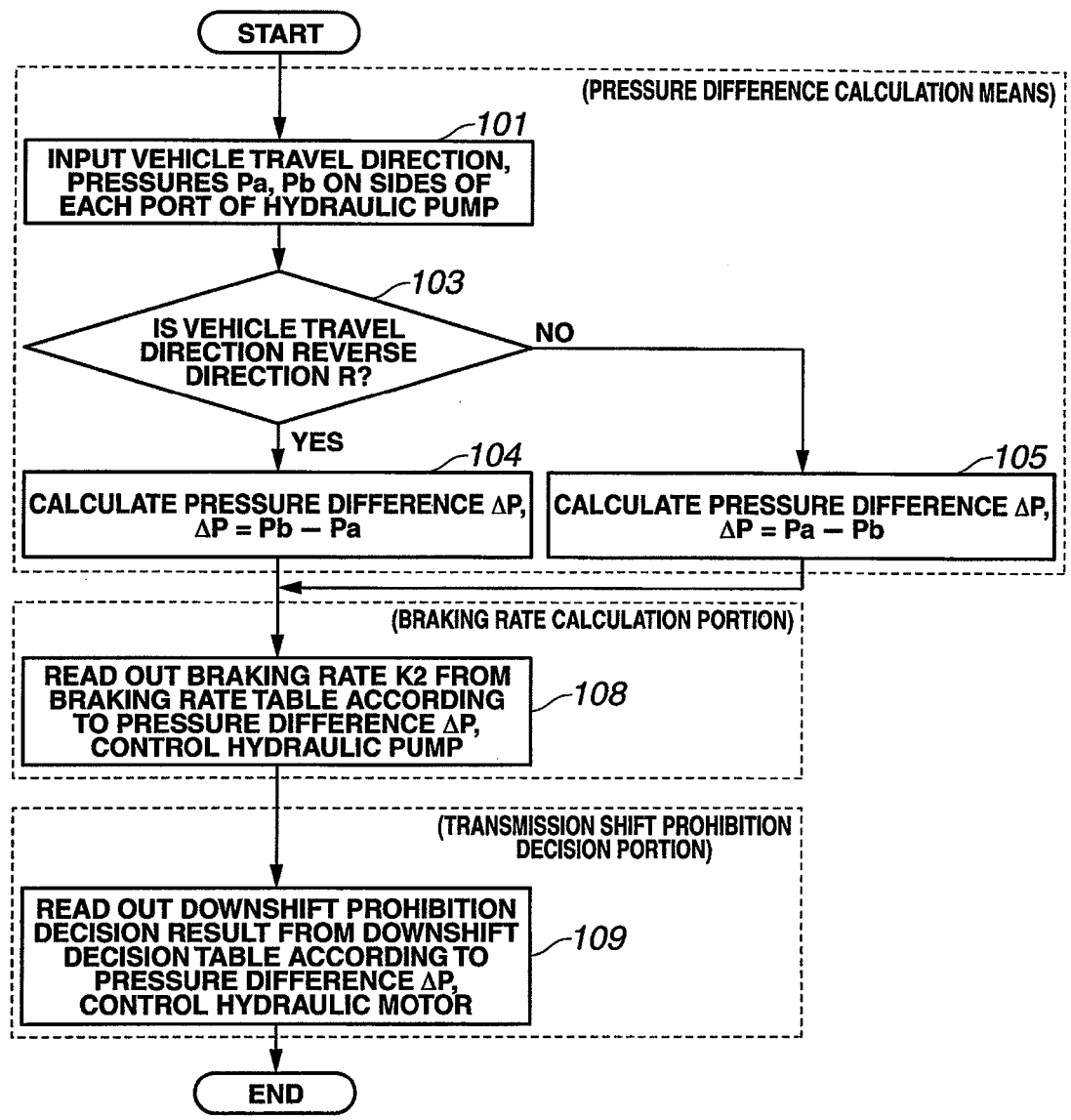
FIG. 4A is a flowchart of another embodiment corresponding to the configuration of FIG. 1A.
Figure 4B:
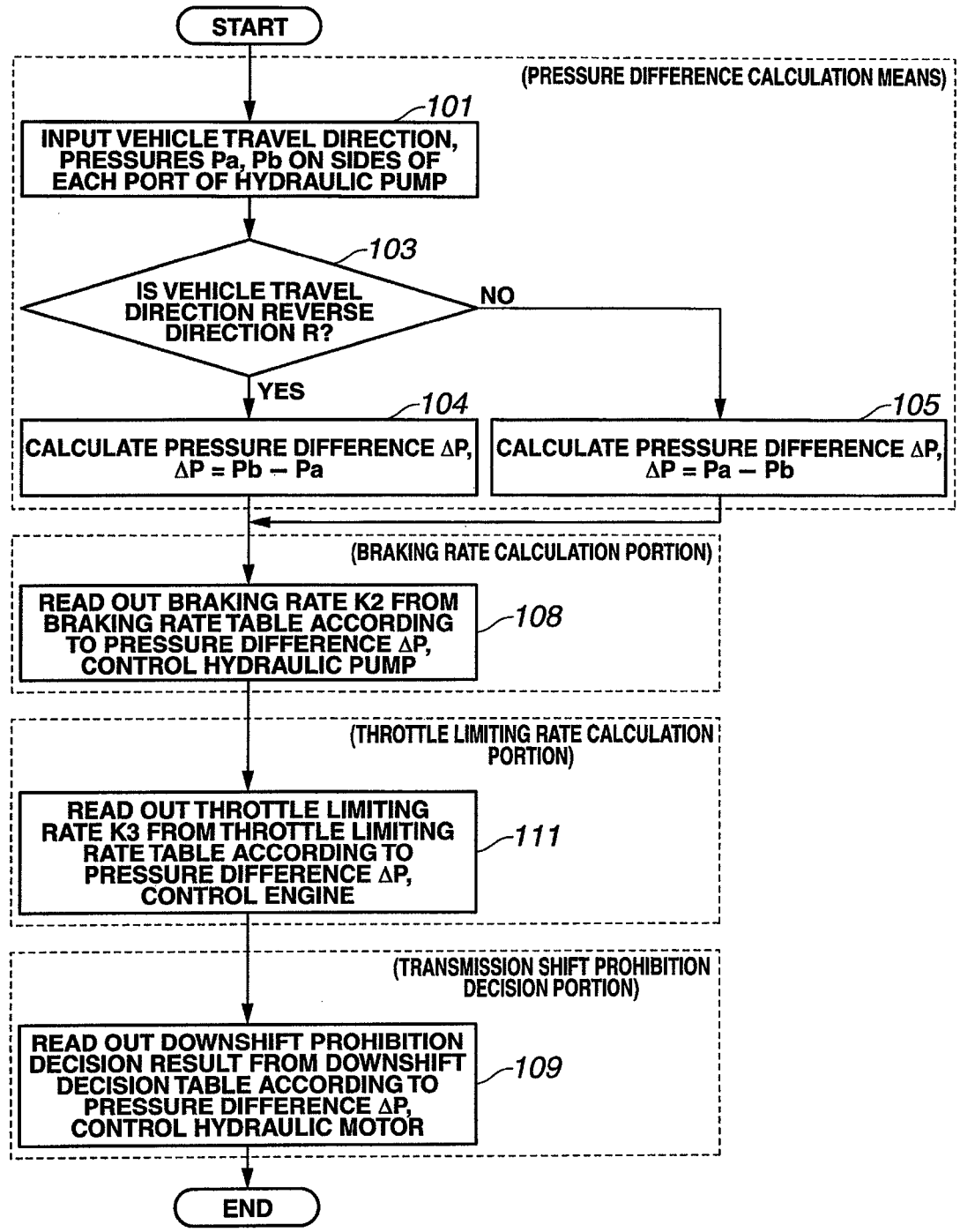
FIG. 4B is a flowchart of another embodiment corresponding to the configuration of FIG. 1B.
Figure 5:
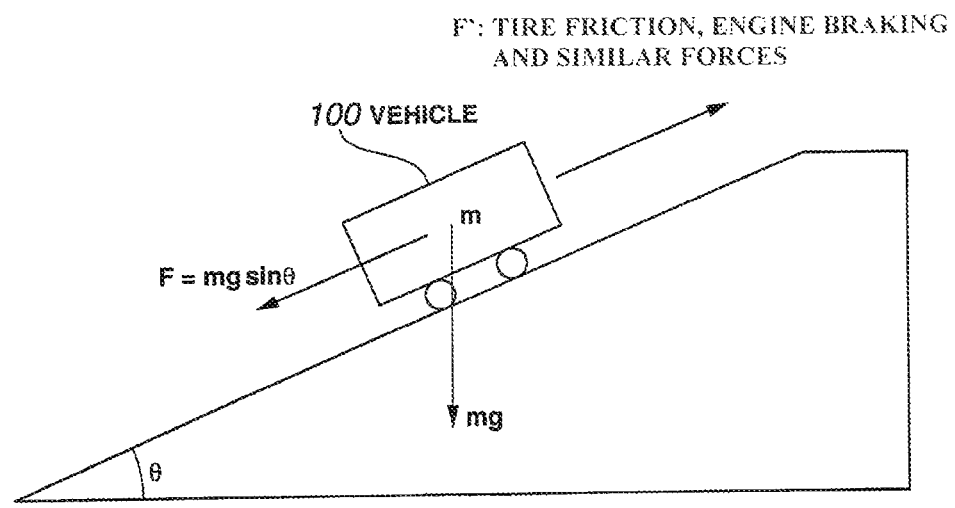
FIG. 5 shows the forces acting on the vehicle body when the vehicle is descending a slope.
Figure 6A:
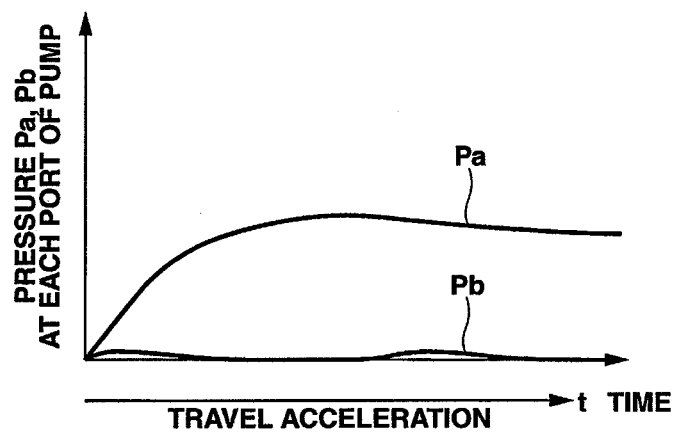
FIG. 6A shows the discharge-side pressure and suction-side pressure detected with the passage of time when the vehicle is traveling over level ground while traveling forward.
Figure 6B:
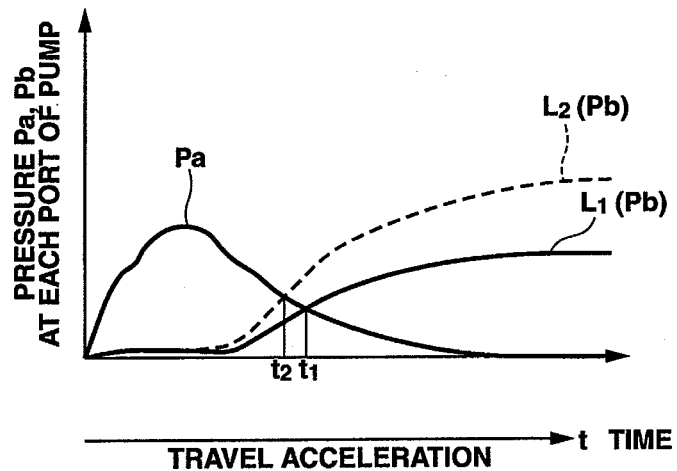
FIG. 6B shows the discharge-side pressure and suction-side pressure detected with the passage of time when the vehicle is descending a slope while traveling forward; and, FIG. 7 shows an HST configuration.
Figure 7:
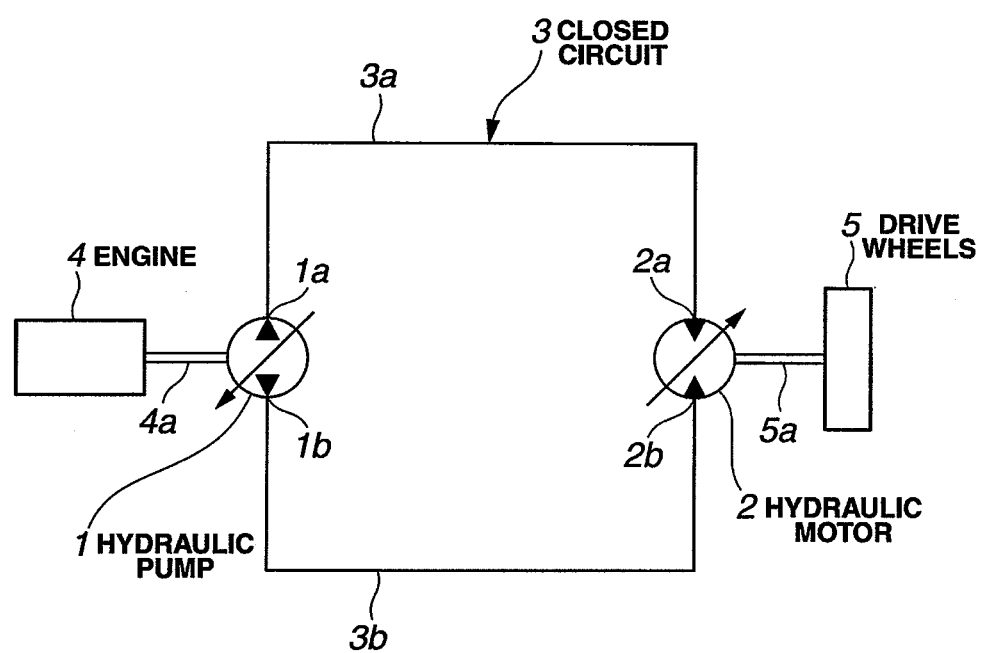

1 Hydraulic pump
2 Hydraulic motor
3 Closed circuit
10 Controller
41A, 41B Pressure sensor
43 Vehicle speed sensor
44 Shift position sensor

The invention claimed is:

1. A control device of a vehicle that is applied to a vehicle having a hydrostatic transmission (HST) configured to include a hydraulic pump connected to an output shaft of an engine, a hydraulic motor connected to a drive wheel, and a closed circuit linking the hydraulic pump and the hydraulic motor, the control device comprising:

vehicle travel direction detection means for detecting a travel direction of the vehicle by detecting a shift position operated by an operator;

pressure detection means for detecting a pressure of pressurized oil on one port side of the hydraulic pump and on the other port side of the hydraulic pump by detecting the pressure of the pressurized oil in an oil path of the closed circuit; and a controller, wherein the controller inputs a detected output of the vehicle travel direction detection means and a detected output of the pressure detection means, when the detected vehicle travel direction is forward travel or neutral, executes a calculation of a value obtained by reducing the detected pressure of the pressurized oil on the other port side from the detected pressure of the pressurized oil on the one port side as a pressure difference obtained by reducing the pressure on the suction port side of the hydraulic pump from the pressure on the discharge port side of the hydraulic pump, when the detected vehicle travel direction is reverse travel, executes a calculation of a value obtained by reducing the detected pressure of the pressurized oil on the one port side from the detected pressure of the pressurized oil on the other port side as a pressure difference obtained by reducing the pressure on the suction port side of the hydraulic pump from the pressure on the discharge port side of the hydraulic pump, and only when the calculated pressure difference changes from a positive value to a negative value and the pressure difference becomes a negative, executes control as to limit at least one of a throttle amount of the engine and a capacity of the hydraulic pump, such that overrun is suppressed in at least one of the hydraulic engine, the hydraulic pump, and the hydraulic motor in proportion as the pressure on the suction port side of the pump become greater than the pressure on the discharge port side of the hydraulic pump.

2. The control device of a vehicle having a hydrostatic transmission according to claim 1, wherein the controller suppresses the overrun by controlling the capacity of the hydraulic pump to be small.

3. The control device of a vehicle having a hydrostatic transmission according to claim 1, wherein the controller suppresses the overrun by controlling the throttle amount of the engine to be small.

4. A control device of a vehicle that is applied to a vehicle having a hydrostatic transmission (HST) configured to include a hydraulic pump connected to an output shaft of an engine, a hydraulic motor connected to a drive wheel, and a closed circuit linking the hydraulic pump and the hydraulic motor, the control device comprising:

vehicle travel direction detection means for detecting a travel direction of the vehicle by detecting a shift position operated by an operator;

pressure detection means for detecting a pressure of pressurized oil on one port side of the hydraulic pump and on the other port side of the hydraulic pump;

transmission ratio adjustment means for adjusting a transmission ratio between the hydraulic pump and the hydraulic motor by an operation of the operator; and a controller, wherein the controller inputs a detected output of the vehicle travel direction detection means, a detected output of the pressure detection means and an adjusted output of the transmission ratio adjustment means, when the detected vehicle travel direction is forward travel or neutral, executes a calculation of a value obtained by reducing the detected pressure of the pressurized oil on the other port side from the detected pressure of the pressurized oil on the one port side as a pressure difference obtained by reducing pressure on the suction port side of the hydraulic pump from the pressure on the discharge-side of the hydraulic pump, when the detected vehicle travel direction is reverse travel, executes a calculation of a value obtained by reducing the detected pressure of the pressurized oil on the one port side from the detected pressure of the pressurized oil on the other port side as a pressure difference obtained by reducing the pressure on the suction port side of the hydraulic pump from the pressure on the discharge port side of the hydraulic pump, when the transmission ratio adjusted this time is smaller than the transmission ratio adjusted the previous time and requires the capacity of the hydraulic motor to be limited and downshifting to be executed, and the calculated pressure difference is a positive value, executes downshifting according to the transmission ratio adjusted this time, and when the transmission ratio adjusted this time is smaller than the transmission ratio adjusted the previous time and requires the capacity of the hydraulic motor to be limited and downshifting to be executed, and the calculated pressure difference changes from a positive value to a negative value and the pressure difference becomes a negative, executes prohibition of downshifting regardless of the transmission ratio adjusted this time.

5. The control device of a vehicle having a hydrostatic transmission according to any of claims 1 through 4, wherein the condition that a vehicle speed is greater than a prescribed threshold value is further added to a condition in claim 1 for executing control by the controller for controlling so as to limit at least one of the throttle amount of the engine and the capacity of the hydraulic pump, or the condition in claim 4 for executing control by the controller for controlling so as to prohibit downshifting.

6. The control device of a vehicle having a hydrostatic transmission according to claim 4, wherein a condition that a vehicle speed is greater than a prescribed threshold value is further added to a condition for executing control by means for executing control so as to prohibit downshifting performed by the means for downshifting.

\* \* \* \* \*